(12) United States Patent
Ishikawa (10) Patent No.: US 7,319,911 B2
(45) Date of Patent: Jan. 15, 2008

(54) PRODUCTION CONTROL APPARATUS AND PRODUCTION CONTROL METHOD

(75) Inventor: Yoshimoto Ishikawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 155 days.

(21) Appl. No.: 11/340,932

(22) Filed: Jan. 27, 2006

(65) Prior Publication Data

US 2006/0173727 A1 Aug. 3, 2006

(30) Foreign Application Priority Data

Feb. 3, 2005 (JP) ............................. 2005-027218

(51) Int. Cl.
*G06F 19/00* (2006.01)
(52) U.S. Cl. ........................ 700/97; 700/99; 700/100
(58) Field of Classification Search .................. 700/97, 700/99–100, 106–107
See application file for complete search history.

(56) References Cited

U.S. PATENT DOCUMENTS 5,826,236 A * 10/1998 Narimatsu et al. ............. 705/8
6,226,561 B1 * 5/2001 Tamaki et al. ............... 700/100
6,311,094 B1 * 10/2001 Iriuchijima et al. ......... 700/100
6,701,201 B2 * 3/2004 Hegde et al. ................ 700/107
7,136,825 B2 * 11/2006 Araki et al. ................... 705/9

OTHER PUBLICATIONS

Levi, P and Hahndel, S—"Optimizing Distributed Production Planning"—Sep. 5-9, 1994—Intelligent Systems Engineering, 1994, Second International Conference. pp. 419-424.*

* cited by examiner

*Primary Examiner*—Alexander Kosowski
(74) *Attorney, Agent, or Firm*—Towsend and Townsend and Crew LLP; Patrick Duncan (57) ABSTRACT

Embodiments of the invention provide a production control apparatus and a method capable of reducing the management load and providing improved convenience. In one embodiment, a control unit assigns an identifier to each unit variation (or each candidate) for each unit to be assembled in a sub-process (or a portion) of the manufacturing process of a product, each unit variation being defined based on requested specifications. Furthermore, the control unit generates and outputs a production plan table that includes sub-identifiers and component identifiers, the sub-identifiers facilitating production planning, the component identifiers being assigned to components used to manufacture each unit variation.

15 Claims, 7 Drawing Sheets

| | | | Name of Unit Variation | α1 | α2 | ... |
|---|---|---|---|---|---|---|
| | | | Unit Variation Identifier | α1 | α2 | ... |
| Group | Component No. | Component Name | | Q | Q | ... |
| A | 0001 | Xa | | 1 | | ... |
| | 0002 | Xb | | ⟨1⟩ | 1 | ... |
| | 0003 | Xc | | | ⟨1⟩ | ... |
| B | 1001 | Ya | | | | ... |
| | 1002 | Yb | | | | ... |
| | 1003 | Yc | | | | ... |
| C | 3001 | Za | | 1 | 1 | ... |
| | 3002 | Zb | | 1 | 1 | ... |

| | | | Name of Unit Variation | α1 | α2 | ... |
|---|---|---|---|---|---|---|
| | | | Unit Variation Identifier | α1 | α2 | ... |
| Group | Component No. | Component Name | Q | Q | | ... |
| A | 0001 | Xa | | 1 | | ... |
| | 0002 | Xb | | ⟨1⟩ | 1 | ... |
| | 0003 | Xc | | | ⟨1⟩ | ... |
| B | 1001 | Ya | | | | ... |
| | 1002 | Yb | | | | ... |
| | 1003 | Yc | | | | ... |
| C | 3001 | Za | | 1 | 1 | ... |
| | 3002 | Zb | | 1 | 1 | ... |

| Component No. | Component Identifiers | | Description | ... |
| --- | --- | --- | --- | --- |
| | Main | Sub | | ... |
| 0001 | PIDa | 00 | xxxx | ... |
| 0002 | PIDb | 00 | xxxx | ... |
| 0002 | PIDc | 00 | xxxx | ... |
| ⋮ | ⋮ | ⋮ | ⋮ | ⋮ |

Fig. 5

| Unit Variation Identifier | Sub-identifier | Description | ... |
| --- | --- | --- | --- |
| α1 | 00 | xxxx | ... |
| α1 | 01 | xxxx | ... |
| ⋮ | ⋮ | ⋮ | ⋮ |

Fig. 6

| | | | | ⋮ | ⋮ | ⋮ | ⋮ | ⋮ |
|---|---|---|---|---|---|---|---|---|
| | | | Name of Unit Variation | α1 | α1 | α2 | ... | |
| | | | Sub-identifier | 00 | 01 | 00 | ... | |
| | | | Unit Variation Identifier | α1 | α1 | α2 | ... | |
| Group | Component Identifier | Component No. | Component Name | Q | Q | Q | | |
| A | PIDa | 0001 | Xa | 1 | 1 | | | |
| | PIDb | 0002 | Xb | ⟨1⟩ | ⟨1⟩ | 1 | | |
| | PIDc | 0002 | Xb | ⟨1⟩ | ⟨1⟩ | 1 | | |
| | PIDd | 0003 | Xc | | | ⟨1⟩ | | |
| ⋮ | ⋮ | ⋮ | ⋮ | | | | | |

Fig. 7

| | | | | ID | PIDa | PIDb | PIDc | PIDd | ... |
|---|---|---|---|---|---|---|---|---|---|
| | | | | Name of Unit Variation | α1 | α1 | α1 | α1 | ... |
| | | | | Sub-identifier | 00 | 00 | 00 | 01 | ... |
| | | | | Unit Variation Identifier | α1 | α1 | α1 | α1 | ... |
| Group | Component Identifier | Component No. | Component Name | Q | Q | Q | Q | Q | ... |
| A | PIDa | 0001 | Xa | 1 | | | 1 | | ... |
| | PIDb | 0002 | Xb | | 1 | | | | ... |
| | PIDc | 0002 | Xb | | | 1 | | | ... |
| | PIDd | 0003 | Xc | | | | | | ... |
| ⋮ | ⋮ | ⋮ | ⋮ | ⋮ | ⋮ | ⋮ | ⋮ | | |

Ca, Cb, Cc point to columns PIDa, PIDb, PIDc respectively.

Fig. 8

| Unit Variation Identifier | Sub-identifier | Name of Unit Variation | Component Identifier | Description |
|---|---|---|---|---|
| $\alpha_1$ | 00 | $\alpha_1$ | PIDa | xxxx |
| $\alpha_1$ | 00 | $\alpha_1$ | PIDb | xxxx |
| ... | ... | ... | ... | ... |

Fig. 9 (PRIOR ART)

| Type of Component | Component | X | Y | ... |
|---|---|---|---|---|
| A | a1 | P | P | ... |
| | a2 | O | | ... |
| | a3 | O | O | ... |
| | a4 | O | | ... |
| | a5 | O | | ... |
| | a6 | O | O | ... |
| B | b1 | P | P | ... |
| | b2 | O | O | ... |

P : Primary
O : Option

PRODUCTION CONTROL APPARATUS AND PRODUCTION CONTROL METHOD

CROSS-REFERENCES TO RELATED APPLICATIONS

This application claims priority from Japanese Patent Application No. JP2005-027218, filed Feb. 3, 2005, the entire disclosure of which is incorporated herein by reference.

BACKGROUND OF THE INVENTION

The present invention relates to a production control apparatus and method used in factories, etc. for manufacturing products.

In recent years, manufacturing electric appliances, etc. has required a very large number of parts since their sophistication and performance have been increased. In the case of production of a hard disk drive, for example, a considerable number of parts must be prepared to assemble even the head stack assembly alone.

To help manufacture such a product, components lists are used at both the design stage and the manufacturing stage. Examples of such components lists include the e-BOM (engineering Bill of Material), which is used at the design stage, and m-BOM (manufacturing BOM), which is convenient for use in production of a product.

These components lists store, for each type of component in the product, technical information, information on a standard component (or a primary candidate component, i.e., a component to be normally selected), and information on substitute components (or secondary candidate components) for substituting for the standard component, etc.

Figure 9:
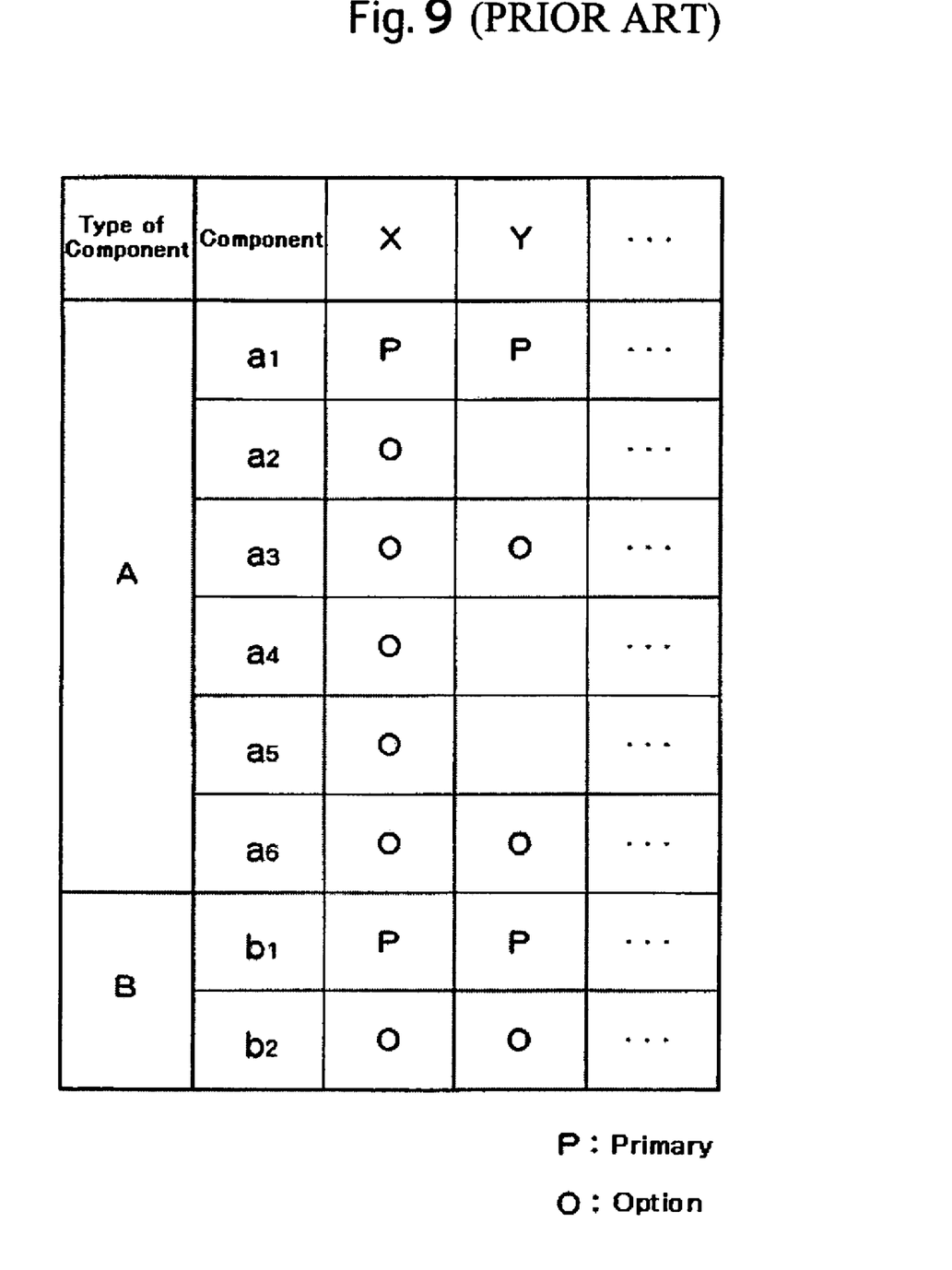
FIG. 9 is a diagram schematically showing an exemplary conventional first components list.

FIG. 9 shows an exemplary components list. The components list in FIG. 9 includes information on two types of components, A and B. As shown in FIG. 9, a primary candidate a1 and five secondary candidates a2 to a6 are listed for the component A, while a primary candidate b1 and a secondary candidate b2 are listed for the component B.

Further, this list also includes information on which one or ones of the primary and secondary candidate components may be used to satisfy the specifications requested by each customer. For example, in the case of customer X, the component A may be the primary candidate a1 or any one of the five secondary candidates a2 to a6, and the component B may be either the primary candidate b1 or the secondary candidate b2.

In the case of customer Y, on the other hand, the component A may be selected from among only the primary candidate a1 and the secondary candidates a3 and a6, though the component B may also be either the primary candidate b1 or the secondary candidate b2.

Thus, the above components list, which does not discriminate between primary and secondary candidate components, may provide information on candidate components which may be used to satisfy the specifications requested by each customer, and may assign a common component item code to the candidates for the same component. This allows easy handling of a components list at the design stage.

Such an arrangement, however, causes a problem at the manufacturing stage, since, for example, the components list assigns a common component item code to all of the primary candidate a1 and the secondary candidates a2 to a6 for the component A, even though they are different components. Therefore, the components list cannot provide information on how many primary candidate components a1 and secondary candidate components a2, etc. are to be ordered for the production. Thus, this list is not suitable for drafting a production plan, which must specify the number of components of each type to be used or ordered.

To overcome the above problem, a different component item code may be assigned to each (candidate) component. In such a components list, for example, 6 different component item codes are assigned to the primary candidate a1 and the secondary candidates a2 to a6, respectively, though these candidate components are used as the same component A. This allows drafting of a plan which specifies the number of components of each type to be used or ordered. However, changing this type of components list requires a large amount of management work. Furthermore, to accommodate the specifications requested by each customer, the list must store information on which candidate components are to be used for each product (for each customer).

BRIEF SUMMARY OF THE INVENTION

Thus, the above conventional production management method employs either a components list which discriminates between primary and secondary candidate components (and which assigns a common component item code to the candidates for the same component), or a components list which does not discriminate between primary and secondary candidate components (and which assigns a different component item code to each candidate component). In either way, the conventional method is not suitable for supporting the overall management and planning at both the design stage and the manufacturing stage. Therefore, this method is not convenient.

To address this problem, the components list which does not discriminate between primary and secondary candidate components may be used in such a way that a different identifier is assigned to each combination of candidate components actually used to meet the specifications requested by each customer, and each identifier is associated with the corresponding requested specifications.

For example, an identifier C01 may be assigned to the combination of the primary candidate a1 and the secondary candidate b1, and an identifier C02 may be assigned to the combination of the primary candidate a1 and the secondary candidate b2, and so on. With this arrangement, the customer Y may be associated with some of these identifiers.

However, simply introducing combination identifiers as described above leads to a large increase in the number of such identifiers when there are many types of components, failing to reduce the management load.

In view of the above problems of the prior art, it is a feature of the present invention to provide a production control apparatus and method capable of reducing the management load and providing improved convenience.

According to one aspect, the present invention provides a production control apparatus adapted to receive a plurality of requested specifications' for a target product, divide a manufacturing process of the target product into a plurality of sub-processes, and generate a production plan table for each sub-process. The production control apparatus comprises: a storage unit for storing unit variation identifiers (or candidate unit identifiers) each assigned to one of a plurality of unit variations (or candidates) for a unit to be assembled in at least one of the plurality of sub-processes and further storing a components list that lists component identifiers of one or more components of each of a plurality of component types used for manufacturing the unit variations identified by the unit variation identifiers, wherein the plurality of unit variations are defined based on the plurality of requested specifications, and wherein the components list is stored in the storage unit in such a way that the components list is associated with the unit variation identifiers; and a plan table generating unit for generating a combination table that lists combinations of the component identifiers and further generating a production plan table for each sub-process based on the combination table.

Thus, the present invention assigns an identifier to each unit variation (or each combination of components) assembled in each sub-process (or each portion) of the manufacturing process. Therefore, even if the product is made up of many types of components, it is possible to prevent an increase in the number of identifiers assigned to the unit variations (or the combinations of components) in each production plan table by increasing the number of components constituting each unit variation. Further, to manage each sub-process, the present invention generates and uses a component list which discriminates between primary and secondary candidate components (and which assigns a different identifier to each candidate component), whereas to manage the entire manufacturing process, the present invention uses a component list which does not discriminate between primary and secondary candidate components (and which assigns a common identifier to the candidates for the same component). This allows improved convenience to be provided.

DETAILED DESCRIPTION OF THE INVENTION

Figure 1:
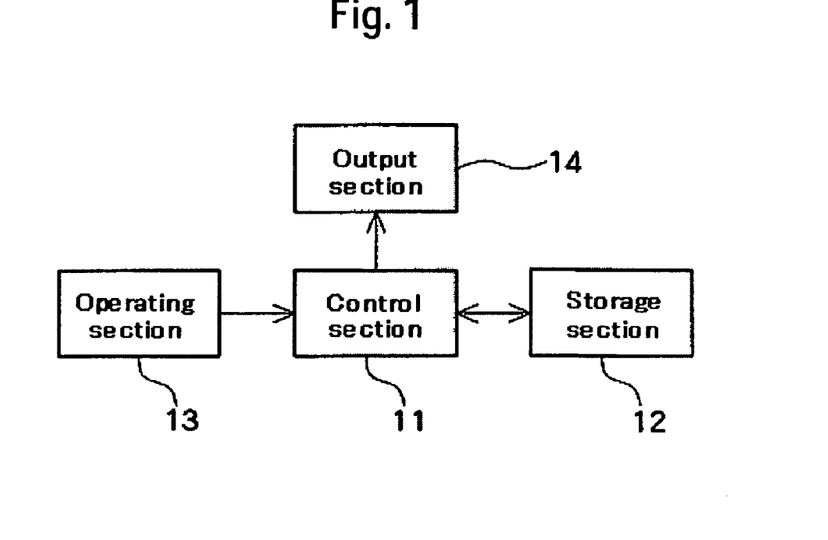
FIG. 1 is a block diagram showing the configuration of an exemplary production control apparatus according to an embodiment of the present invention.

An exemplary embodiment of the present invention will be described with reference to the accompanying drawings. As shown in FIG. 1, a production control apparatus of the present embodiment comprises a control unit 11, a storage unit 12, an operating unit 13, and an output unit 14. The control unit 11 may be implemented by a CPU, etc. and operates according to a program stored in the storage unit 12. Based on a components list (a first components list) prepared for an entire manufacturing process, the control unit 11 performs processing to generate another components list (a second components list) for each sub-process of the entire manufacturing process and generate a plan table. The processing performed by the control unit 11 will be described in detail later. It should be noted that the first components list discriminates between primary and secondary candidate components (and assigns a common identifier to the candidates for the same component), while the second components list does not discriminate between primary and secondary components (and assigns a different identifier to each candidate component).

The storage unit 12 is made up of a computer-readable storage medium such as RAM or a hard disk. The storage unit 12 stores programs executed by the control unit 11. The storage unit 12 also stores a first components list defined for the entire manufacturing process, as well as parameters for generating a second components list for each sub-process of the entire manufacturing process based on the first components list. Furthermore, the storage unit 12 functions as working memory for the control unit 11. An exemplary first components list and exemplary parameters stored in the storage unit 12 will be described in detail later.

The operating unit 13 is made up of a mouse, a keyboard, etc. and receives an operational instruction from the user and transfers it to the control unit 11. The output unit 14 is made up of a display and/or a printer and outputs various types of information such as a plan table generated by the control unit 11 in response to an instruction entered from the operating unit 13.

Figure 2:
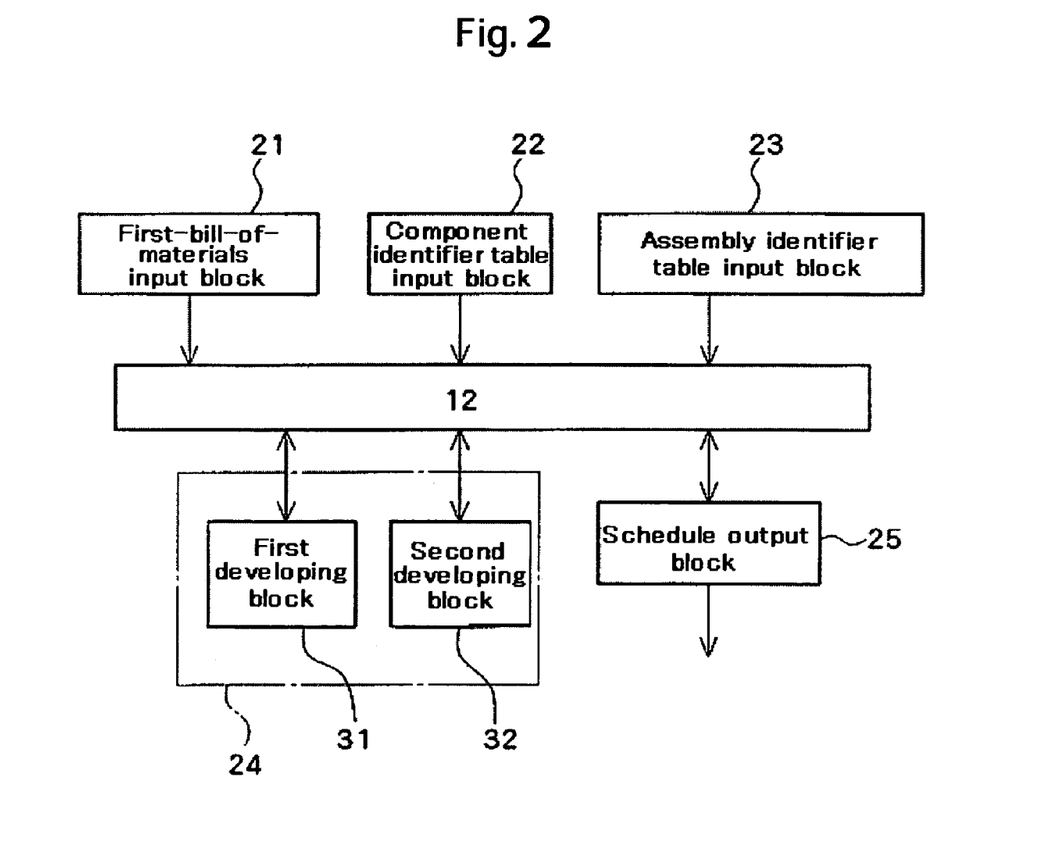
FIG. 2 is a block diagram showing the functions of the exemplary production control apparatus of the embodiment.

As shown in FIG. 2, the production control apparatus of the present embodiment includes the following functional sections: a first components list input section 21, a component identifier table input section 22, an assembly identifier table input section 23, a plan table generating section 24, and a plan table output section 25. The plan table generating section 24 includes a first expanding section 31 and a second expanding section 32. According to the present embodiment, the above functional sections are implemented by executing software stored in the storage unit 12 by use of the control unit 11. However, the present invention is not limited to this particular arrangement. These functional sections may be implemented by hardware.

The first components list input section 21 receives a first components list for a target product and stores it in the storage unit 12. It should be noted that the manufacturing process of the target product is divided into a plurality of sub-processes. A different identifier is assigned to each of a plurality of unit variations (or candidates) for a unit to be assembled in at least one of the sub-processes. (The unit variations are determined based on a plurality of requested specifications.)

For example, when unit variations (or candidate units) $\alpha 1$, $\alpha 2$, and so on have been defined for a unit $\alpha$, each unit variation is assigned a different identifier. These identifiers must be unique and may be made up of an alphanumerical string.

Figure 3:
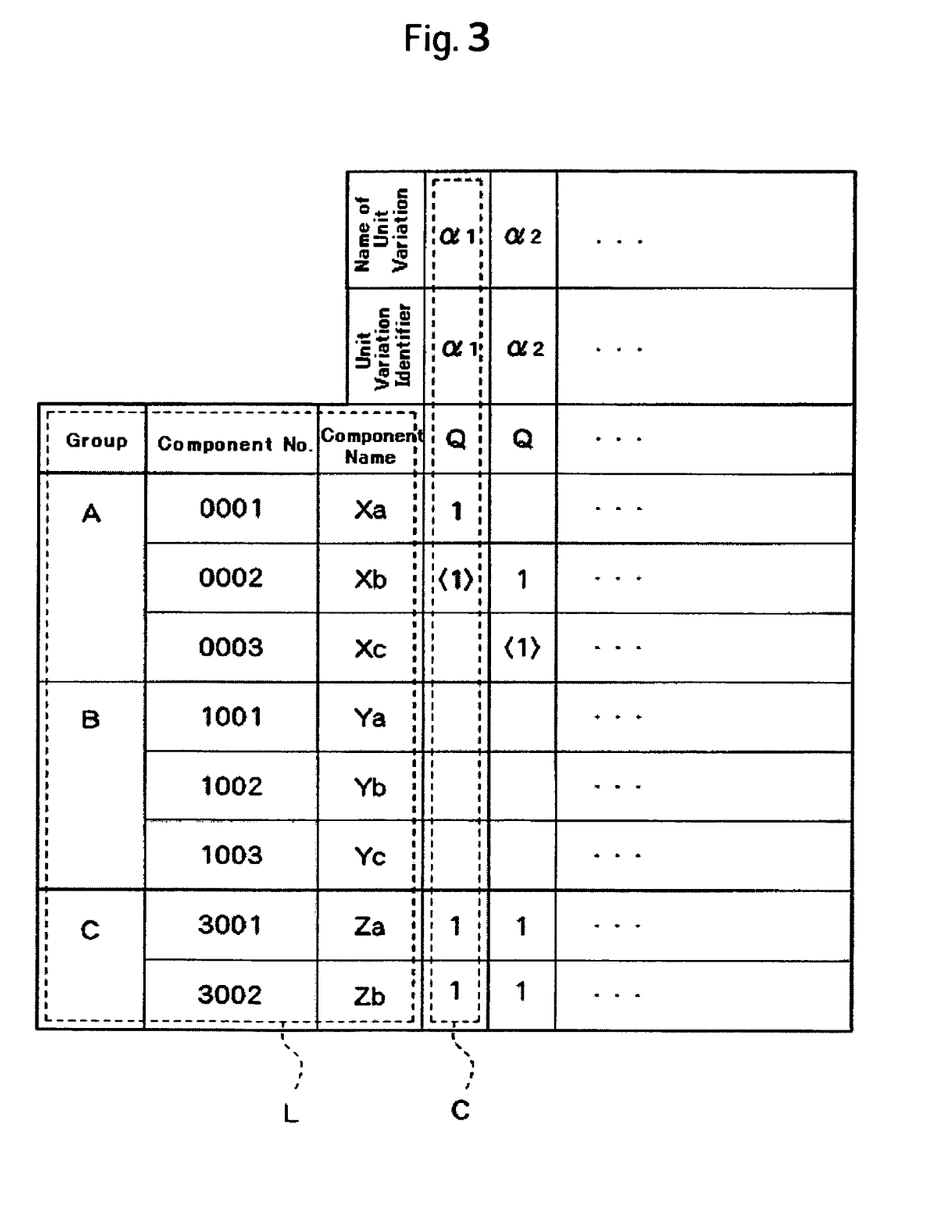
FIG. 3 is a diagram illustrating an exemplary first components list of the embodiment.

According to the present embodiment, a first components list is defined for each unit variation and used to produce the unit variation. FIG. 3 shows an exemplary first components list. The first components list includes: a list (or column) L for listing each candidate component; and a column C for indicating the number of candidate components of each type required for each unit variation. The list (or column) L may not list specific component names. The list (or column) L of the first components list shown in FIG. 3 lists each type of candidate component, and a component number is assigned to each type of candidate component.

In each field of the column C, a number in no brackets indicates the number of primary candidates for a component, while that in brackets (e.g., <1>) indicates the number of secondary candidates for a component. A component identifier (or component number) is assigned to each primary candidate component and each secondary candidate component listed in the first components list stored in the storage unit 12. This means that it is possible to tell whether a particular component identifier (or component number) has been assigned to a standard component (i.e., a primary candidate component) or a substitute component (i.e., a secondary candidate component).

For example, the first components list shown in FIG. 3 indicates the following. The unit variation α1 may be made up of: the primary candidate component in group A whose component number and name are 0001 and Xa; the primary candidate component in group C whose component number and name are 3001 and Za; and the primary candidate component in group C whose component number and name are 3002 and Zb. Or alternatively, the unit variation α1 may be made up of: the secondary candidate component in group A whose component number and name are 0002 and Xb; the primary candidate component in group C whose component number and name are 3001 and Za; and the primary candidate component in group C whose component number and name are 3002 and Zb. It should be noted that each blank field indicates a number of 0.

Figure 4:
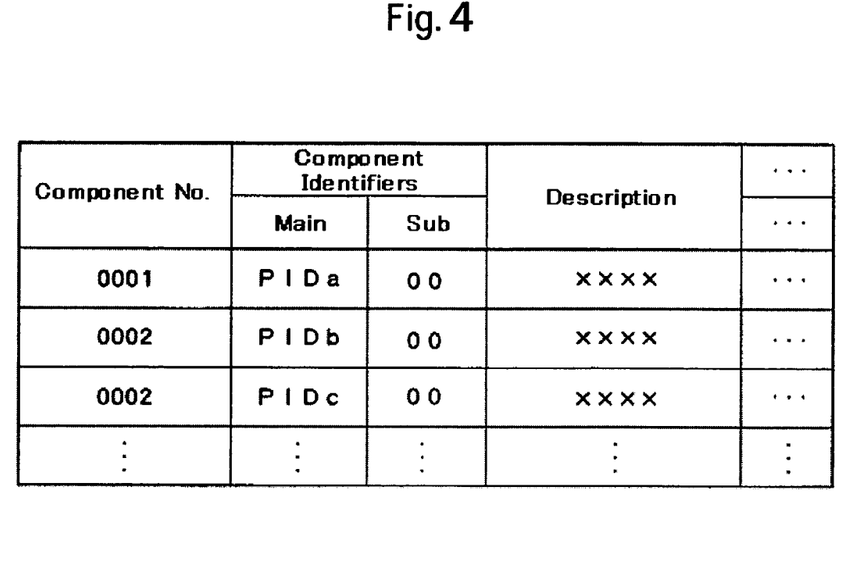
FIG. 4 is a diagram illustrating an exemplary component identifier table of the embodiment.

The component identifier table input section 22 receives a record entry for a component identifier table. Each record in the component identifier table primarily includes a component number, a component identifier (including main and sub identifiers), and a description. FIG. 4 shows an exemplary component identifier table. According to the present embodiment, the display or the like displays a cell (or an input box) to receive an entry for the component identifier table from the user through the operating unit 13. The received information is stored in the storage unit 12. It should be noted that the first components list, which is entered through the first components list input section 21, may be configured such that the same component number is assigned to a plurality of candidate components from which to select. However, in the component identifier table, a different identifier is assigned to each candidate component.

Figure 5:
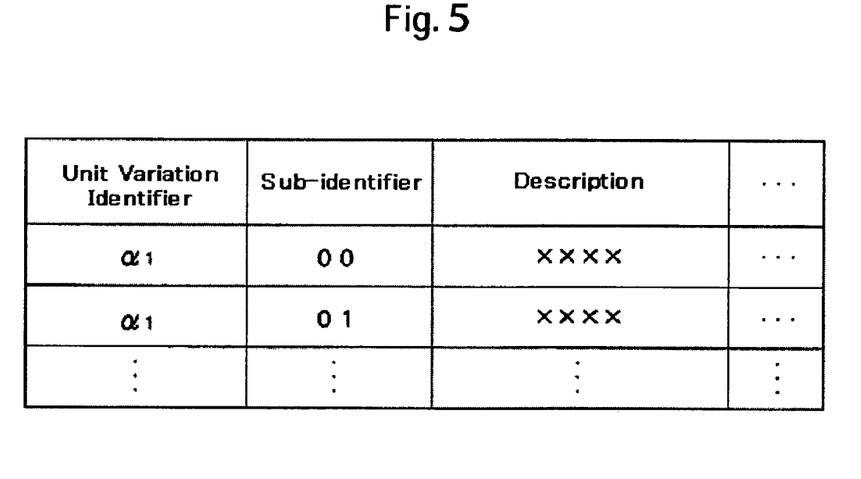
FIG. 5 is a diagram illustrating an exemplary assembly identifier table of the embodiment.

The assembly identifier table input section 23 receives an entry for an assembly identifier table and stores it in the storage unit 12. Each record in the assembly identifier table includes a unit variation identifier, a sub-identifier, and a description, as shown in FIG. 5. (The unit variation identifier and the sub-identifier may be used together to uniquely identify a unit variation.) According to the present embodiment, the display or the like displays a cell (or an input box) to receive an entry for the assembly identifier table from the user through the operating unit 13. The received information is stored in the storage unit 12.

Figure 6:
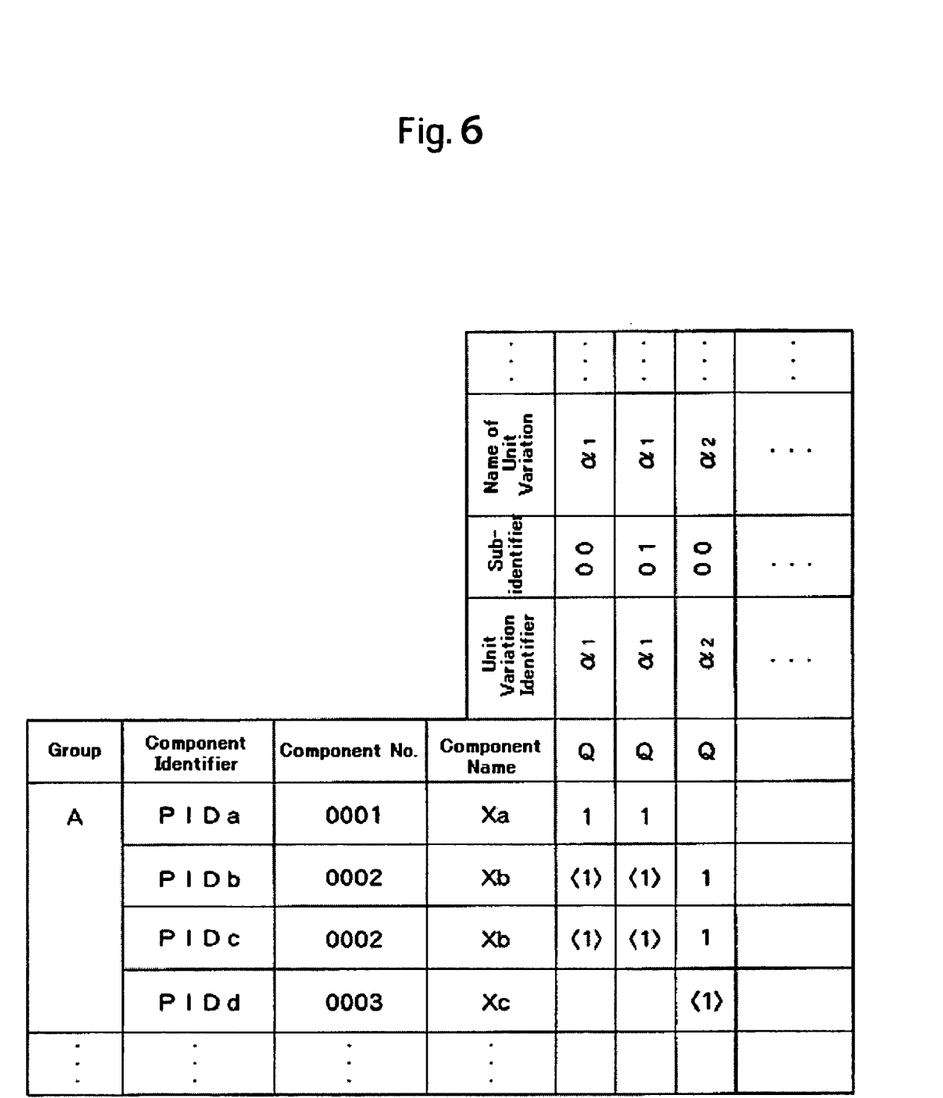
FIG. 6 is a diagram illustrating an exemplary first-expanded first components list generated according to the embodiment.

Upon receiving a processing start instruction from the operating unit 13, the production plan generating section 24 initiates the operations of the first expanding section 31 and the second expanding section 32. The first expanding section 31 generates a first-expanded first components list as shown in FIG. 6 based on the first components list, the component identifier table, and the assembly identifier table stored in the storage unit 12. Specifically, the first expanding section 31 associates each candidate component in the list (or column) L with a corresponding component identifier in the component identifier table. Further, if the same component number has been assigned to a plurality of candidate components from which to select, as described above, the first expanding section 31 creates as many records as there are such components and associates each of these components with a corresponding component identifier in the component identifier table. For example, the component with a component number of 0002 in the first components list in FIG. 3 is assigned two component identifiers, PIDb and PIDc, in the component identifier table shown in FIG. 4. Therefore, the first-expanded first components list in FIG. 6 includes two records for this component (having a component number of 0002), and these records store the component identifiers PIDb and PIDc, respectively. It should noted that the number of components PIDb and the number of components PIDc required for each unit variation is the same as the number of components 0002 in group A required for the unit variation.

Further, in the first-expanded first components list shown in FIG. 6, the first expanding section 31 also creates as many records as there are sub-identifiers for each unit variation. For example, the unit variation α1 in the first components list in FIG. 3 is assigned two sub-identifiers, 00 and 01, in the assembly identifier table in FIG. 5. Therefore, the first-expanded first components list includes two records for the unit variation α1, and these records store the sub-identifiers 00 and 01, respectively.

Figure 7:
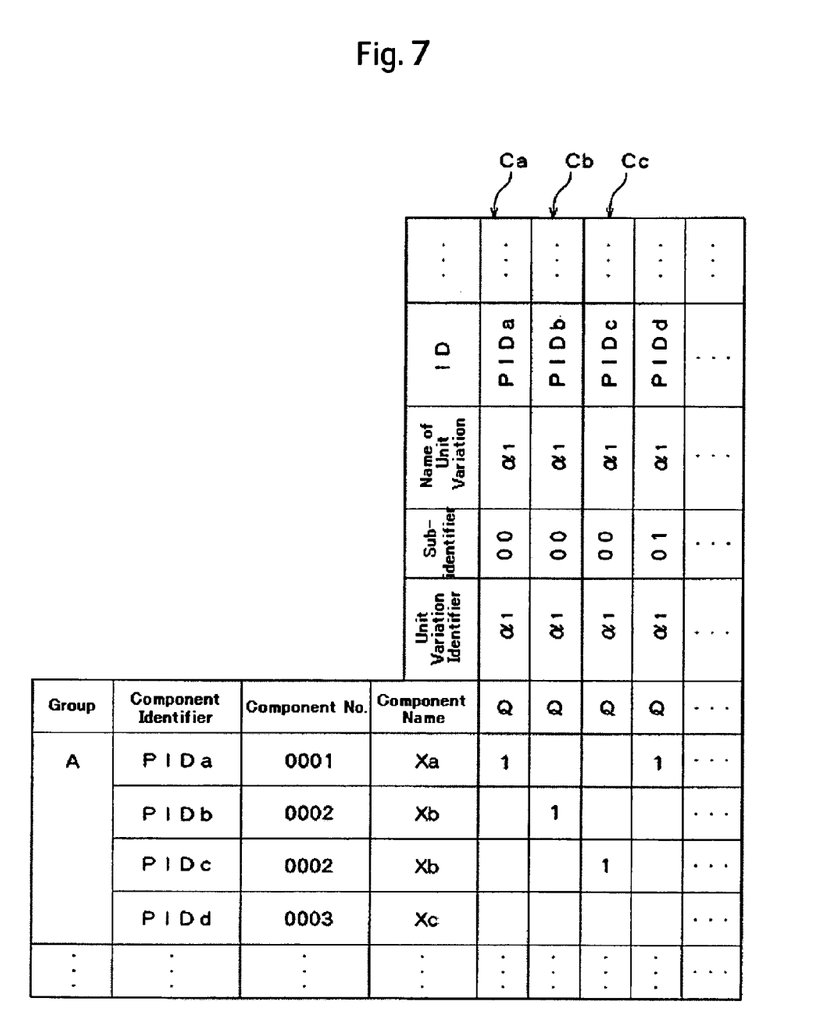
FIG. 7 is a diagram illustrating an exemplary second-expanded first components list generated according to the embodiment.

The second expanding section 32 generates a second-expanded first components list as shown in FIG. 7 based on the first-expanded first components list. That is, the second expanding section 32 newly creates, in the second-expanded first components list, as many records as there are primary and secondary candidate components in the first-expanded first components list, as shown in FIG. 7. Then, the second expanding section 32 sets the fields of each record.

Specifically, in the first-expanded first components list in FIG. 6, two component names, "Xa" and "Xb", are set for the unit variation α1. Furthermore, two identifiers, PIDb and PIDc, are set for the component name "Xb". That is, the unit variation α1 may include one of the three components identified by the identifiers PIDa, PIDb, and PIDc, respectively. Therefore, the second expanding section 32 creates three records for the unit variation α1. In FIG. 7, these three records are denoted by Ca, Cb, and Cc and include the component identifiers PIDa, PIDb, and PIDc, respectively.

It should be noted that in the above example, there is only one component for which both primary and secondary candidates are set. However, both candidates may be set for a plurality of components. In such a case, as many records as there are candidate component combinations are added to the components lists. For example, assume that primary candidate Xa and secondary candidate Xb are set for a component X, and primary candidate Ya and secondary candidate Yb are set for a component Y. In such a case, there are the following 4 combinations:

(1) Xa and Ya
(2) Xb and Ya
(3) Xa and Yb
(4) Xb and Yb.

Therefore, 4 records are created in the column C for this unit variation.

Further, the second expanding section stores a component identifier (indicating one of the 4 combinations) in the ID field of each created record.

Figure 8:
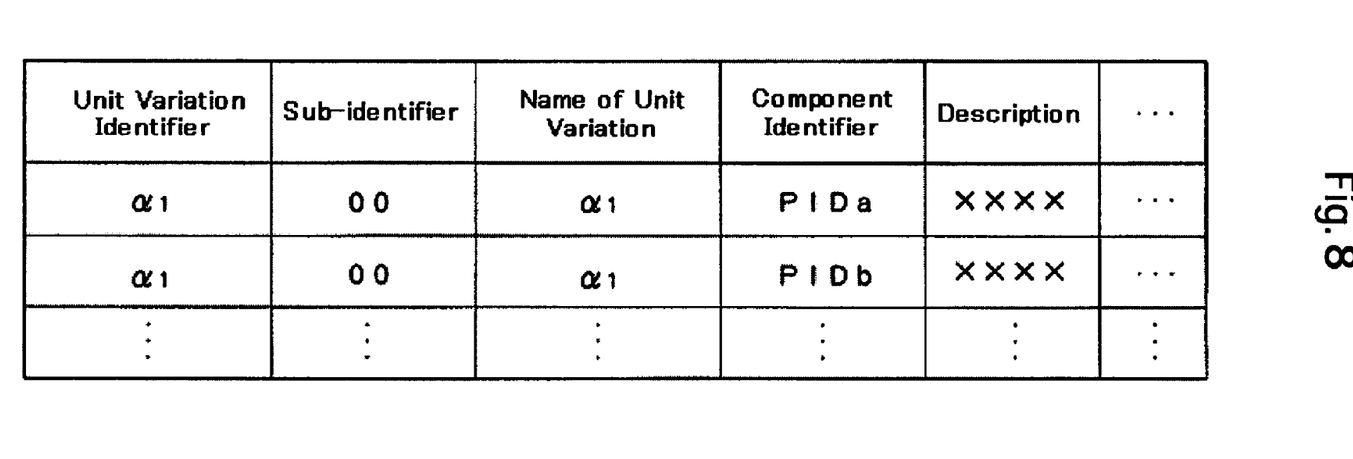
FIG. 8 is a diagram illustrating an exemplary production plan table generated according to the embodiment.

The plan table output section 25 extracts from the second-expanded first components list a list which includes the identifiers and the sub-identifiers of unit variations and the component identifiers of at least some of the components used for production of these unit variations, and outputs it as a production plan table. Further, this list may include a description for each unit variation. For example, the production plan table shown in FIG. 8 is generated from the second-expanded first components list shown in FIG. 7. The plan table output section 25 outputs this production plan table to the output unit 14. It should be noted that the component identifiers included in the production plan table may be limited to those of the components for which both primary and secondary candidates have been defined.

The control unit 11 of the present embodiment performs the above processing for each sub-process of the product manufacturing process to generate and output a production plan table for each sub-process. The user drafts a production plan of each unit variation in each sub-process based on these production plan tables. According to the present embodiment, each production plan table includes, for each unit assembled in a sub-process of the product manufacturing process, the identifiers of the unit variations defined based on requested specifications, unit variation sub-identifiers for facilitating production planning, and the component identifiers of the components used for production of the unit variations. That is, each production plan table of the present embodiment includes a different identifier for each combination of components (or each unit variation) and hence may be used as a components list of the type that discriminates between primary and secondary candidate components (that is, a second component list). It should be noted that this production plan table is created for each sub-process (or each portion) of the manufacturing process. Therefore, even if the product is made up of an increased number of components, it is possible to prevent a large increase in the number of identifiers assigned to the unit variations (or the combinations of components) in each production plan table by increasing the number of components constituting each unit variation. That is, the present embodiment may reduce the management load and provide improved convenience.

Further, the control unit 11 manages units assembled in each sub-process by use of the identifiers of their unit variations. That is, the control unit 11 uses unit variation identifiers to control the inventory of unit variations and to manage components lists for the superordinate assemblies (each made up of a plurality of units or unit variations). Thus, (in this case), the control unit 11 uses a first components list as shown in FIG. 3, which does not discriminate between primary and secondary candidate components.

That is, according to the present embodiment, when a hard disk drive is manufactured, for example, the user (of the production control apparatus) creates a first components list (as shown in FIG. 3) for each sub-process, which assembles a unit in the hard disk drive, such as a head stack assembly (HSA) or a disk coil motor (VCM). The user then enters the created first components list to the production control apparatus.

An identifier is assigned to each unit variation (or each candidate) for the unit (for example, HSA) at that time and the above first components list is configured such that it does not discriminate between primary and secondary candidate components. Upon receiving these first components lists, the production control apparatus performs the above processing to generate, for each sub-process which assembles a unit (for example, HSA), a second components list which discriminates between primary and secondary candidate components based on each received first components list.

Then, the production control apparatus performs processing for production planning or parts procurement planning by use of the second components list, which includes a unique component name for each candidate component (that is, this list discriminates between primary and secondary candidate components and handles all candidate components equally). For example, in this second components list, a different component item code is assigned to each of the primary candidate a1 and the secondary candidates a2 to a6 for the component A. This makes it easy to determine how many primary candidates a1 and secondary candidates a2, etc. are to be ordered, or to draft a production plan which specifies the number of components of each type to be ordered or used, for example.

Then, each subassembly (or a unit), such as an HSA, produced based on the above second components list is assigned (or associated with) a unit variation identifier, which makes it possible to perform production management of the superordinate product (that is, the hard disk drive) based on a first components list, which does not discriminate between primary and secondary candidates. This allows the entire product to be managed by use of unit variation identifiers without using component item codes (identifiers). As a result, even if the product is made up of many types of components, it is possible to prevent a large increase in the total number of identifiers assigned to combinations of components.

It should be noted that the control unit 11 may receive an expansion restricting table and store it in the storage unit 12. The expansion restricting table includes a list of unit variations which are not to be newly assembled. The first expanding section 31 checks this expansion restricting table and removes from the first-expanded first components list the columns related to the unit variations listed in the expansion restricting table, thereby reducing the number of unit variations (or combination of components) to be listed in the production plan table.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A production control apparatus adapted to receive a plurality of requested specifications for a target product, divide a manufacturing process of the target product into a plurality of sub-processes, and generate a production plan table for each sub-process, the production control apparatus comprising:

a storage unit configured to store unit variation identifiers each assigned to one of a plurality of unit variations for a unit to be assembled in at least one of the plurality of sub-processes and further storing a components list that lists component identifiers of one or more components of each of a plurality of component types used for manufacturing the unit variations identified by the unit variation identifiers, wherein the plurality of unit variations are defined based on the plurality of requested specifications, and wherein the components list is stored in the storage unit in such a way that the component list is associated with the unit variation identifiers; and a plan table generating unit configured to generate a combination table that lists combinations of the component identifiers and further generating a production plan table for each sub-process based on the combination table.

2. The production control apparatus as claimed in claim 1, wherein the components list stored in the storage unit lists, for each component type, a component identifier of a standard component and a component identifier of a substitute component in such a way as to allow discrimination between the component identifier of the standard component and the component identifier of the substitute component.

3. The production control apparatus as claimed in claim 1, wherein the plan table generating unit comprises a first expanding section configured to generate a first-expanded components list based on the first components list, a component identifier table, and an assembly identifier table stored in the storage unit.

4. The production control apparatus as claimed in claim 3, wherein the first expanding section associates each candidate component in the first-expanded components list with a corresponding component identifier in the component identifier table.

5. The production control apparatus as claimed in claim 3, wherein the plan table generating unit comprises a second expanding section configured to generate a second-expanded components list based on the first-expanded components list by newly creating, in the second-expanded components list, as many records as there are primary and secondary candidate components in the first-expanded components list.

6. A method for controlling production by use of a computer, the method comprising:
   receiving a plurality of requested specifications for a target product;
   dividing a manufacturing process of the target product into a plurality of sub-processes;
   storing unit variation identifiers each assigned to one of a plurality of unit variations for a unit to be assembled in at least one of the plurality of sub-processes, wherein the plurality of unit variations are defined based on the plurality of requested specifications;
   storing a components list that lists component identifiers of one or more components of each of a plurality of component types used for manufacturing the unit variations identified by the unit variation identifiers, wherein the components list is associated with the unit variation identifiers; and
   generating a combination table that lists combinations of the component identifiers and further generating a production plan table for each sub-process based on the combination table.

7. The method as claimed in claim 6, wherein the components list stored in the storage unit lists, for each component type, a component identifier of a standard component and a component identifier of a substitute component in such a way as to allow discrimination between the component identifier of the standard component and the component identifier of the substitute component.

8. The method as claimed in claim 6, wherein generating the combination table comprises generating a first-expanded components list based on the first components list, a component identifier table, and a assembly identifier table stored in the storage unit.

9. The method as claimed in claim 8, wherein the first-expanded component list associates each candidate component in the first-expanded components list with a corresponding component identifier in the component identifier table.

10. The method as claimed in claim 8, wherein generating the combination table further comprises generating a second-expanded components list based on the first-expanded components list by newly creating, in the second-expanded components list, as many records as there are primary and secondary candidate components in the first-expanded components list.

11. A computer-readable storage medium for storing a production control program for causing a computer to control production, the production control program comprising:
   code for receiving a plurality of requested specifications for a target product;
   code for dividing a manufacturing process of the target product into a plurality of sub-processes;
   code for storing unit variation identifiers each assigned to one of a plurality of unit variations for a unit to be assembled in at least one of the plurality of sub-processes, wherein the plurality of unit variations are defined based on the plurality of requested specifications;
   code for storing a components list that lists component identifiers of one or more components of each of a plurality of component types used for manufacturing the unit variations identified by the unit variation identifiers, wherein the components list is associated with the unit variation identifiers; and
   code for generating a combination table that lists combinations of the component identifiers and further generating a production plan table for each sub-process based on the combination table.

12. The computer-readable storage medium as claimed in claim 11, wherein the components list stored in the storage unit lists, for each component type, a component identifier of a standard component and a component identifier of a substitute component in such a way as to allow discrimination between the component identifier of the standard component and the component identifier of the substitute component.

13. The computer-readable storage medium as claimed in claim 11, wherein the code for generating the combination table comprises code for generating a first-expanded components list based on the first components list, a component identifier table, and a assembly identifier table stored in the storage unit.

14. The computer-readable storage medium as claimed in claim 13, wherein the first-expanded component list associates each candidate component in the first-expanded components list with a corresponding component identifier in the component identifier table.

15. The computer-readable storage medium as claimed in claim 13, wherein the code for generating the combination table further comprises code for generating a second-expanded components list based on the first-expanded components list by newly creating, in the second-expanded components list, as many records as there are primary and secondary candidate components in the first-expanded components list.

* * * * *